US010212216B2

United States Patent
Kim et al.

(10) Patent No.: US 10,212,216 B2
(45) Date of Patent: Feb. 19, 2019

(54) INTEGRATED NETWORK CONTROLLING SYSTEM, NETWORK CONTROLLING APPARATUS AND METHOD, AND A READABLE MEDIUM CONTAINING THE METHOD

(71) Applicant: GWANGJU INSTITUTE OF SCIENCE AND TECHNOLOGY, Gwangju (KR)

(72) Inventors: Jong-Won Kim, Gwangju (KR); Tae-Heum Na, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 543 days.

(21) Appl. No.: 14/956,315

(22) Filed: Dec. 1, 2015

(65) Prior Publication Data

US 2016/0156508 A1 Jun. 2, 2016

(30) Foreign Application Priority Data

Dec. 1, 2014 (KR) ........................ 10-2014-0169554

(51) Int. Cl.
*H04L 12/24* (2006.01)
*H04L 29/08* (2006.01)
*H04W 4/60* (2018.01)

(52) U.S. Cl.
CPC .............. *H04L 67/10* (2013.01); *H04L 41/12* (2013.01); *H04L 41/22* (2013.01); *H04W 4/60* (2018.02)

(58) Field of Classification Search
CPC ......... H04L 41/22; H04L 67/10; H04L 41/12; H04W 4/60
See application file for complete search history.

(56) References Cited

U.S. PATENT DOCUMENTS 8,332,782 B1 * 12/2012 Chang ................. H04L 12/6418
707/794
8,468,466 B2 * 6/2013 Cragun ............... G06F 3/04812
715/834

(Continued)

OTHER PUBLICATIONS

[Supportive Materials for Exception to Loss of Novelty] Kim, "Understanding OpenStack from SDN/NV Viewpoint", Published at 2014 Open Stack Day in Korea on Feb. 18, 2014, 13 pages, Seoul, Korea.

(Continued)

*Primary Examiner* — Oanh Duong
(74) *Attorney, Agent, or Firm* — Hauptman Ham, LLP

(57) ABSTRACT

The present invention relates to a network controlling apparatus including a node status sensing unit configured to sense at least one node operating at least two centers, a center module configured to define at least two closed curves having a common internal area without intersecting each other, to define a first area as the common internal area of the at least two closed curves and a second area as a space between the at least two closed curves and to display the at least two centers in the second area by dividing the at least two centers with a division line connecting the at least two closed curves in the second area; a connection module configured to display a connection line indicating a connection status of the at least one node; and a UI display unit configured to display the lines provided by the center module and the connection module.

13 Claims, 8 Drawing Sheets

(56) References Cited

U.S. PATENT DOCUMENTS

| | | | |
|---|---|---|---|
| 9,407,521 B1* | 8/2016 | Kulkarni | H04L 43/08 |
| 2003/0103088 A1 | 6/2003 | Dresti et al. | |
| 2004/0046784 A1* | 3/2004 | Shen | G06F 3/048 |
| | | | 715/733 |
| 2006/0041461 A1* | 2/2006 | Vucina | G06Q 10/10 |
| | | | 345/440 |
| 2010/0251182 A1* | 9/2010 | Komatsu | H04N 5/44513 |
| | | | 715/834 |
| 2011/0102381 A1 | 5/2011 | Choi et al. | |
| 2013/0166146 A1* | 6/2013 | Tanaka | G06F 3/0488 |
| | | | 701/36 |
| 2014/0049464 A1* | 2/2014 | Kwak | G06F 3/0487 |
| | | | 345/156 |
| 2015/0257814 A1* | 9/2015 | Berry | A61B 18/12 |
| | | | 606/34 |

OTHER PUBLICATIONS

[Supportive Materials for Exception to Loss of Novelty] Na et al., "Inter-connection Automation for OF@TEIN Multi-point International OpenFlow Islands", Published at the 9th International Conference on Future Internet Technologies on Jun. 20, 2014, 23 pages, Tokyo, Japan.

* cited by examiner

INTEGRATED NETWORK CONTROLLING SYSTEM, NETWORK CONTROLLING APPARATUS AND METHOD, AND A READABLE MEDIUM CONTAINING THE METHOD

CROSS REFERENCE TO RELATED APPLICATION

This application claims the benefit of Korean Patent Application No. 10-2014-0169554, filed on Dec. 1, 2014, entitled "INTEGRATED NETWORK CONTROLLING SYSTEM, NETWORK CONTROLLING APPARATUS AND METHOD, AND A READABLE MEDIUM CONTAINING THE METHOD", which is hereby incorporated by reference in its entirety into this application.

BACKGROUND

1. Technical Field

The present invention relates to an ethylene-alpha olefindiene resin blend composition and a method for preparing the same.

2. Description of the Related Art

Network configurations for providing a virtual tenant to network (VTN) in a multipoint cloud environment may be divided into an underlay configuration and an overlay configuration.

An underlay network includes physical/virtual environments, and is mainly controlled by an operator. A VTN which is unique to each user is created based on the underlay network and is utilized as intended by the user. In configuring the overlay network, multiple layers may be utilized and various kinds of equipment belonging to different layers may be employed.

The network status in a cloud environment, which is characterized by sharing of resources, depends on time, and therefore the network environment changes significantly over time. Visibility of the network environment having many is required for smooth operation of the network and stable use of the system. In particular, visibility is a very important issue along with configuration and control in the DevOps methodology.

In order to enhance user convenience for a computer system, the following methods have been proposed. US Patent Application Publication No. 20030103088 ('User interface for a remote control application') discloses a technology of enhancing user convenience by disposing user menus in a circle, and US Patent Application Publication No. 20110102381 ('Apparatus and Method for Portable Terminal Having Object Display Dial'), filed by SAMSUNG ELECTRONICS CO. LTD., illustrates that icons disposed in a circle are rotated in a dialing manner.

According to the user interface (hereinafter, UI) proposed in the aforementioned reference documents, icons are disposed in a circle to enhance visibility of use of computer software. However, this technology is not sufficient to obtain satisfactory visibility of a network in view of DevOps and in the cloud environment.

BRIEF SUMMARY

It is one aspect of the present invention to provide a means capable of enhancing visibility of a network for all participants including an operator and users in a network environment providing multiple resources and network nodes.

In accordance with one aspect of the present invention, a network controlling apparatus includes: a node status sensing unit configured to sense at least one node operating at at least two centers; a center module configured to define at least two closed curves having a common internal area without intersecting each other, to define a first area as the common internal area of the at least two closed curves and a second area as a space between the at least two closed curves and to display the at least two centers in the second area by dividing the at least two centers with a division line connecting the at least two closed curves in the second area; a connection module configured to display a connection line indicating a connection status of the at least one node; and a user interface (UI) display unit configured to display the lines provided by the center module and the connection module. Thereby, visibility of a complex network may be enhanced and it may be possible to quickly cope with change of the network environment.

The closed curves have a circular shape. Thereby, visibility may be further enhanced for the users.

The first area may contain a clouding area and a cloud center module configured to display a cloud center, the cloud center being placed in the clouding area. Thereby, visibility of cloud resources may be enhanced when the resources are utilized. Of course, the node may be configured for the cloud center and displayed. In addition, an empty area may be provided between the cloud center and the closed curves. Thereby, multiple cloud centers may be easily recognized.

The network controlling apparatus may further include a network apparatus module configured to provide at least one closed curve accommodating the first area in the second area and to divide the centers into domains according to network levels and display the same. In this case, for it is important for networking may be quickly recognized, and when a problem occurs, the problem may be quickly and accurately coped with. In addition, the closed curve dividing the domains in one of the centers preferably is formed in a circular shape to enhance visibility. When the domains belong to the same level, the domains are displayed with the same attribute even if the centers are different from each other. In addition, the domains may include hardware resources of the centers, and the network controlling apparatus may further include an available-resource module configured to shift and display a division line defining an outer line of the domains such that an area of a domain of the domains contained in the centers is increased when a resource of the domain is large. Thereby, participants can establish an optimized network environment. In addition, the network controlling apparatus may further include a domain module configured to integrally display at least two of the domains positioned adjacent to each other in at least one of the centers without distinguishing the at least two of the domains from each other.

The network controlling apparatus may further include a virtualization module configured to display a virtualized node of the at least one node differently from a non-virtualized node. Thereby, a node which can be shifted may be shifted to an optimized environment.

The network controlling apparatus may further include a visualization determination unit configured to set visualization ranges of the first area and the second area differently according to an authority of a participant accessing a network. Thereby, various services may be implemented.

The network controlling apparatus may further include a status determination unit configured to recognize a status of the connection line and display the connection line differently. Thereby, a problem with the network may be easily recognized.

The connection line may be displayed in a different color according to load to the connection line. Thereby, visibility may be enhanced for participants.

In accordance with another aspect of the present invention, a network controlling apparatus includes: a node status sensing unit configured to sense at least one node operating at at least two centers; a common user interface (UI) generator configured to generate a common indication common to the at least two centers using at least two concentric circles and a line extending in a radial direction; an individual UI generator configured to generate individual indications individually applied to the at least two centers; and a UI display unit configured to display results of the common UI generator and the individual UI generator together on a screen. Thereby, the overall situation of the network may be easily recognized.

The common UI generator may differently dispose the at least two centers in the radial direction and provides a greater radial angle for a larger resource of the centers.

A connection status of the node may be indicated by a connection line, and a cloud system may be placed at a core of the concentric circles. In this case, various resources of the network may be easily recognized.

In accordance with another aspect of the present invention, an integrated network controlling system includes a network connecting at least two centers; and a network controlling apparatus computer to control network connection for the at least two centers, wherein the network controlling apparatus may be configured to: generate the at least two centers by disposing the at least two centers in a radial direction; generate at least one node operating at the at least two centers; generate a connection line indicating a status of connection between the at least one node; generate a user interface (UI) as information containing the at least two centers, the node and the connection line and transmit the generated UI to at least one of the at least two centers; and change the UI according to a change request and transmit the changed UI. Thereby, visibility of the status of the whole network may be enhanced and the networking operation may be efficiently performed.

The centers may include different local area centers belonging to different local areas or different computers belonging to the same local area. Thereby, the present invention may be implemented in various environments.

Different information items may be displayed at the respective centers according to an authority. Thereby, various services may be provided according to levels of participants.

The change request may include shift of a virtualized node of the at least one node. Thereby, efficiency of an operation performed by the virtualized node may be maximized.

In accordance with an aspect of the present invention, a method for controlling a network includes: defining at least two closed curves having a common internal area without intersecting each other; mapping the at least two centers to a second area using a division line connecting the at least two closed curves, the second area being defined as a space between the at least two closed curves; mapping nodes operating at the at least two centers to positions of the nodes; and mapping connections lines indicating connection statuses of the nodes operating at the centers. Thereby, high possibility may be provided and the network may be conveniently controlled and used.

The method may further include defining a clouding area in a first area defined as the common internal area of the at least two closed curves, a cloud system being mapped to the clouding area. Thereby, use of a cloud system placed outside the current network may also be easily controlled. In addition, the method may further include defining an empty space between the clouding area and the closed curves as an empty area. Thereby, efficiency of use of the cloud system may be enhanced.

The method may further include defining domains according to network levels of the at least two centers using a line provided in the second area. Thereby, various methods for improving the current network may be easily implemented.

According to embodiments of the present invention, visibility of a network can be greatly enhanced for persons associated with the network. Other advantages of the present invention will be more accurately disclosed in the following description.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof. The present invention can be readily practiced by those skilled in the art through addition, change, omission and combination of constituents included in other embodiments within the scope of the present invention, which may come within the scope of the appended claims and their equivalents.

Terms, as used herein, are defined as follows. In the description below, a node is a functional block connected to the network and may be understood as including a virtual node such as a virtual machine (VM) and a container and a physical node such as an entity, a computer and a memory. The entity may include a switch, a router and a gateway. The nodes may be connected to each other over various distinguishable networks including a local area network, a private network, and the Internet.

Figure 1:
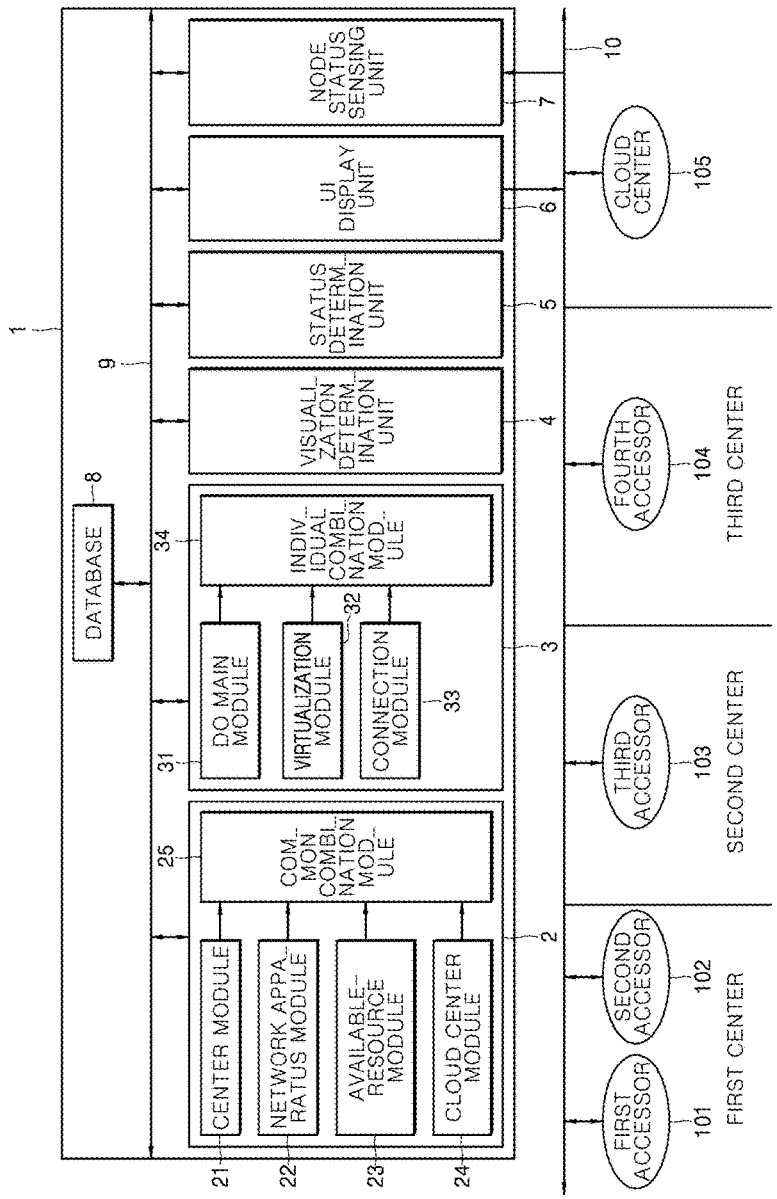
FIG. 1 is a block diagram illustrating an integrated network controlling system.
Figure 2:
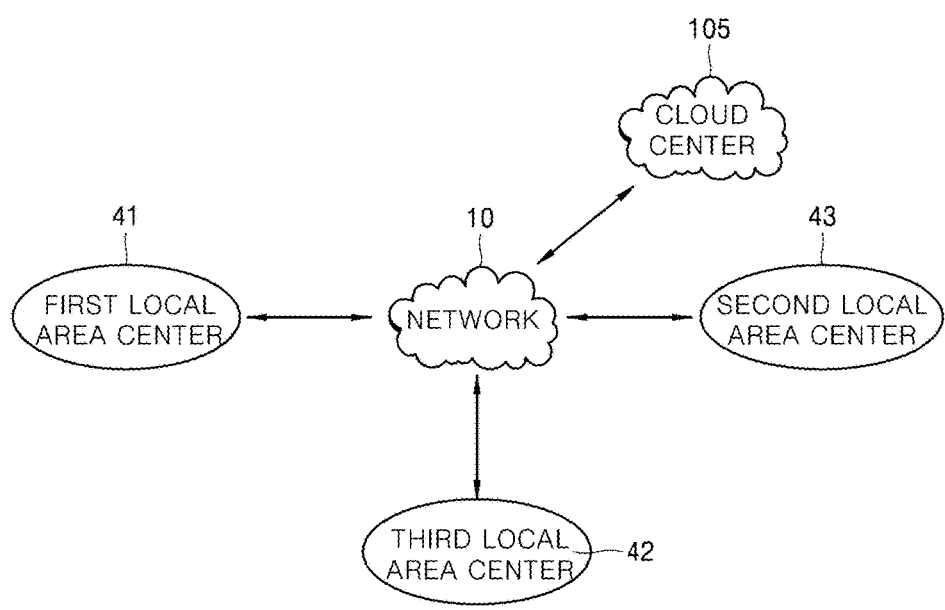
FIG. 2 is a diagram illustrating application of the integrated network controlling system of FIG. 1 at a long distance.
Figure 3:
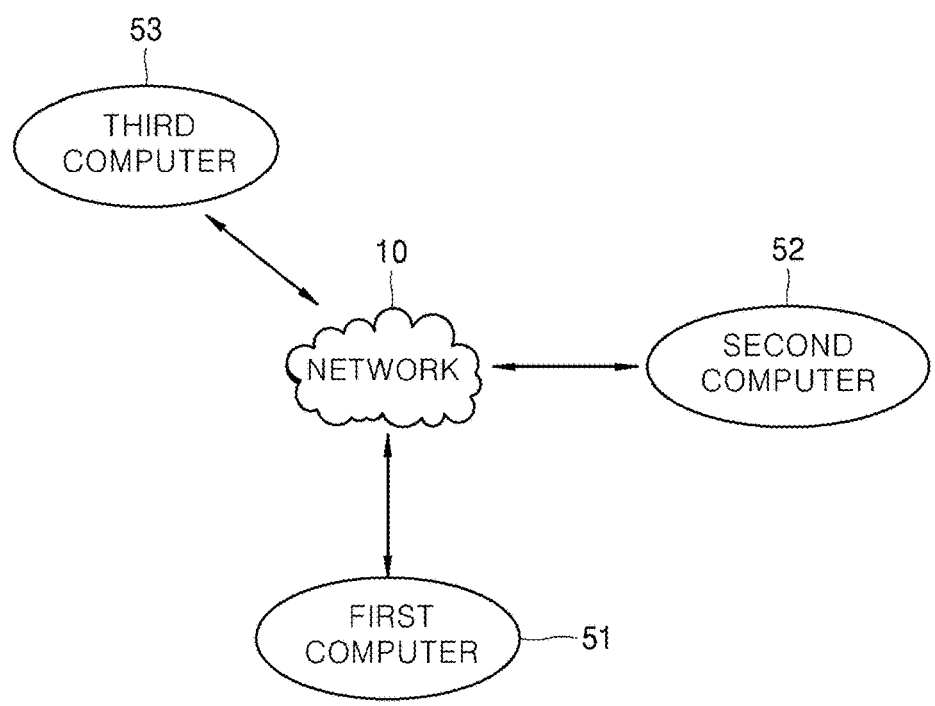
FIG. 3 is a diagram illustrating application of the integrated network controlling system of FIG. 2 at a short distance.

FIG. 1 is a block diagram illustrating an integrated network controlling system, FIG. 2 is a diagram illustrating application of the integrated network controlling system of FIG. 1 at a long distance, and FIG. 3 is a diagram illustrating application of the integrated network controlling system of FIG. 2 at a short distance.

Referring to FIGS. 1 to 3, the integrated network controlling system includes a network 10 connecting centers placed in at least two areas and a network controlling system for controlling the connection network for the at least two centers.

As shown in FIG. 3, the centers are local area centers which are at a short distance from each other. Examples of the centers may be computers 51, 52 and 53 placed in respective rooms. In addition, the centers may include centers placed in respective nations. The local area centers may include a first local area center 41, a second local area center 43, and a third local area center 42. The centers may also include a cloud center 105 providing resources for at least storing/processing operations. In this case, each of the local area centers may include different computers or local area centers which are connected over another network 9 in one local area.

The network controlling apparatus 1 may provide to a center where an operator is positioned. The network controlling apparatus 1 may also be provided to another center. Network controlling systems may be positioned at two or more centers and operatively connected with each other or a network controlling system may be provided only to a center where a user is positioned. The network controlling system may be provided separately from the centers.

Hereinafter, the network controlling apparatus 1 will be described in more detail.

To aid in understanding overall configuration of the network, the configuration of the network will be described first. Referring to the figures, a first center, a second center, a third center and a cloud center are connected over the second network 10, and the centers may include first, second, third and fourth accessors 101, 102, 103 and 104. The first accessor 101 may function as an operator, and the other accessors may function as users. FIG. 1 exemplarily shows a case where the network controlling system is separately connected to the second network 10 irrespective of the centers.

Referring to FIG. 1, the network controlling apparatus 1 may include at least two centers connected to a network, a database 8 for storing information about participants, authorities and the like, a node status sensing unit 7 for sensing at least one node operated by accessors 101, 102, 103 and 14 connected to the at least two centers, a common UI generator 2 for generating common indications common to the at least two centers by including two concentric circles and a line extending in a radial direction in displaying a UI, an individual UI generator 3 for generating individual indications for the at least the two centers, and a UI display unit 6 for displaying results generated by the common UI generator 2 and the individual UI generator 3 together on a screen. The UI display unit 6 may change the display status of the UI in various manners according to convenience of the users or operator and conditions.

The common UI generator 2 radially disposes the at least two centers in generating the UI, and displays a greater radial angle for a center having a larger number of resources in order to enhance visibility for the users and the operator. For example, if the amount of calculation resources of a center is large, the corresponding region may be displayed at a long distance to indicate, to the users and the operator, that many virtual machines (VMs) can be operated. In this way, the common UI generator 2 provides information needed to generate a common UI by referencing information per center.

The connection status of the node may be indicated by a connection line. For example, suppose that the second accessor 102 of the first center performs a task by generating a VM at the cloud center 105. In this case, the second accessor 102 shows a connection line connecting a network apparatus at the first center and the VM of the cloud center 105. Thereby, use of the network by the second accessor may be conveniently and accurately visualized in a manner, particularly, a connection structure manner.

The cloud center 105 may be placed at the core of the concentric circles. Examples of the cloud center 105 may include various typical commercial systems. Since many people access the cloud center 105, which has a large capacity of resources, to use the resources, the cloud center 105 is preferably placed at the core of the concentric circles.

Hereinafter, configuration of the common UI generator 2 will be described in more detail.

The common UI generator 2 is provided with a center module 21. The center module 20 recognizes respective centers connected to the network by referencing information from the node status sensing unit 7. Thereby, the center module 21 establishes basic configuration of the network with the UI, using at least two closed curves which are not intersected with each other but at least have a common internal area. Specifically, a first area is defined as the common area of the at least two closed curves. In addition, the second area is defined as a space between the at least two closed curves. Herein, the centers may be divided by a division line connecting the at least two closed curves in the second area. The basic configuration as above allows quick and accurate recognition of centers included in the network, connection to the network and resources. Herein, the closed curves may have a circular shape.

The cloud center module 24 may indicate, through a UI, placement of at least one cloud center in the first area. Herein, one or more cloud centers may be provided in the first area. If no cloud center is provided, the cloud center module 24 may not be provided. In addition, an empty space may be provided between a cloud center and the second area, such that visibility of multiple cloud centers can be enhanced for users.

The network apparatus module 22 may define at least one closed curve for accommodating the first area in the second area. Thereby, the network apparatus module 22 may classify the centers into domains according to network levels thereof when the centers are displayed. Herein, the at least one closed curve may include layer 1 to layer 7 distinctively displayed as layers of the network. Layer 1, which has low usability, may not be displayed, and at least one of the layers may not be displayed. Each layer may be displayed by employing a different color, different transparency, or a three-dimensional height. With this configuration, a layer of the network suffering a problem of, for example, overload to a specific apparatus on the network may be readily recognized when an application of an accessor does normally operate. Of course, it is presumed that the user is allowed to see a corresponding area of the network in many cases. For example, the corresponding area may not be seen to a user who does not have the authority to visualize a specific part. In this case, the accessor should comply with the current status. This may be understood as meaning that visualizing can be controlled by the operator. Preferably, the at least one closed curve may not be intersected with each other but at least have a common internal area. Preferably, the at least one closed curve may have a circular shape. Preferably, if the same domain is given on the network when the centers are different from each other, the centers may be displayed using the same attribute, for example the same color, the same transparency or the same three-dimensional height. Thereby, domains may be more conveniently distinguished from each other according to network levels.

The available-resource module 23 may shift a division line forming the outer line of a domain such that a large area is given to the domain having a large resource. For example, for an enlarged domain 75 of FIG. 4, the available-resource module 23 may indicate that the hardware resource 65 is large. In this way, the hardware resource 65 of a center which is large and is thus capable of storing a large amount of data or driving many VMs may be more conveniently visualized.

The common combination module 25 combines and provides pieces of information from the respective modules 21, 22, 23 and 24.

The individual UI generator 3 is distinctively displayed at a certain local area center or serves to visualize interaction between local area centers.

The individual UI generator 3 includes a domain module 31. The domain module 31 includes a domain module capable of integrally displaying the domains without distinguishing between the domains. If the domains are integrally displayed by the domain module 31, UI complexity may be reduced, and thus a visualization operation allowing a user to easily utilize a network resource may be performed. For example, if the user need not see a complex network apparatus, the domains may be integrated into a single area. The domains may be separately displayed for the operator such that the operator can easily address a problem associated with operation of the network. The range of visualization may vary depending on the degree of authority assigned to the user.

The visualization module 32 may indicate a virtualized node using a dotted line. For example, a VM which is a virtualized node may be indicated with a dotted line such that the VM can be easily and distinctively used. If a virtualized node such as the VM does not normally operate at the current position, drag-and-drop may be applied to allow easy migration of the area for operation of the VM on the UI. The VM may be shown to one user but may not be shown to another user.

A connection module 33 may display a connection line for indicating the connection statuses of the nodes. Suppose that the second accessor 102 of the first center performs a task by generating a VM at the cloud center 105. In this case, the second accessor 102 shows a connection line connecting a network apparatus at the first center and the VM of the cloud center 105. Using the connection line, the second user 102 may conveniently and accurately visualize various kinds of information such as an employed network path, the source of a utilized resource and a network connection.

An individual combination module 34 combines and provides pieces of information from the respective modules and 31, 32 and 33.

The network controlling apparatus 1 may further include the following constituents.

The network controlling apparatus 1 may further include a visualization determination unit 4. The visualization determination unit 4 may set the ranges of the first area and the second area differently according to the authority of the accessor. In this case, a large amount of information may be shown to the accessor if the accessor is the operator, and a small amount of information may be provided to the accessor if the accessor is a normal user. Thereby, information is efficiently provided to the users, and thus the network resources may be conveniently utilized. For example, the condition of the network apparatus may need to be accurately checked in a situation. This is the case of the top operator. In this case, all pieces of information from the network apparatus module 22 may be provided. For example, closed curves defining the domains in the second area may be extended in a direction perpendicular to the sheet of drawings to display the domains in three dimensions such that heights of the domains differ from each other according to network levels. In this case, the operator can manage the network more conveniently and accurately.

The network controlling apparatus 1 may further include a status determination unit 5. The status determination unit 5 may check the statuses of connection lines and display the connection lines differently depending on the degree of applied load. Thereby, a user can utilize the quality of connection of a network which the user is currently using. For example, a connection line may be displayed in red if load on the connection line is high. This means that there are many nodes connected to the same network. In this case, the user may intuitively recognize that it is better to avoid the corresponding nodes. If the connection line represents a link having high performance (capacity), the connection line may be indicated by a bold line.

Hereinafter, operation of the network controlling apparatus discussed above will be described based on various exemplary UIs which can be implemented by the network controlling apparatus. Operations of the network controlling apparatus 1 will be clearly understood from the exemplary UIs disclosed below.

First, operation of the network controlling apparatus is briefly described below as an operation of the integrated network controlling system. In order to generate a UI, the network controlling apparatus 1 may perform operations of radially disposing and displaying the at least two centers, displaying nodes operated by a user, displaying a status of connection between the nodes using a connection line, generating a UI as information including the at least two centers, the nodes and the connection line, and transmitting the UI to the at least two centers. The UI may be displayed on the display of a participant. In addition, when there are various change requests from the user for, for example, shifting the position of a VM, changing the network switch and switching the connection of the network to another local area center, the node status sensing unit may recognize the requests, change the UI, and transmit the changed UI to the centers.

FIGS. 4 to 7 illustrate examples of UIs implemented by a network controlling apparatus. The UIs may be provided to display apparatuses of different users.

Figure 4:
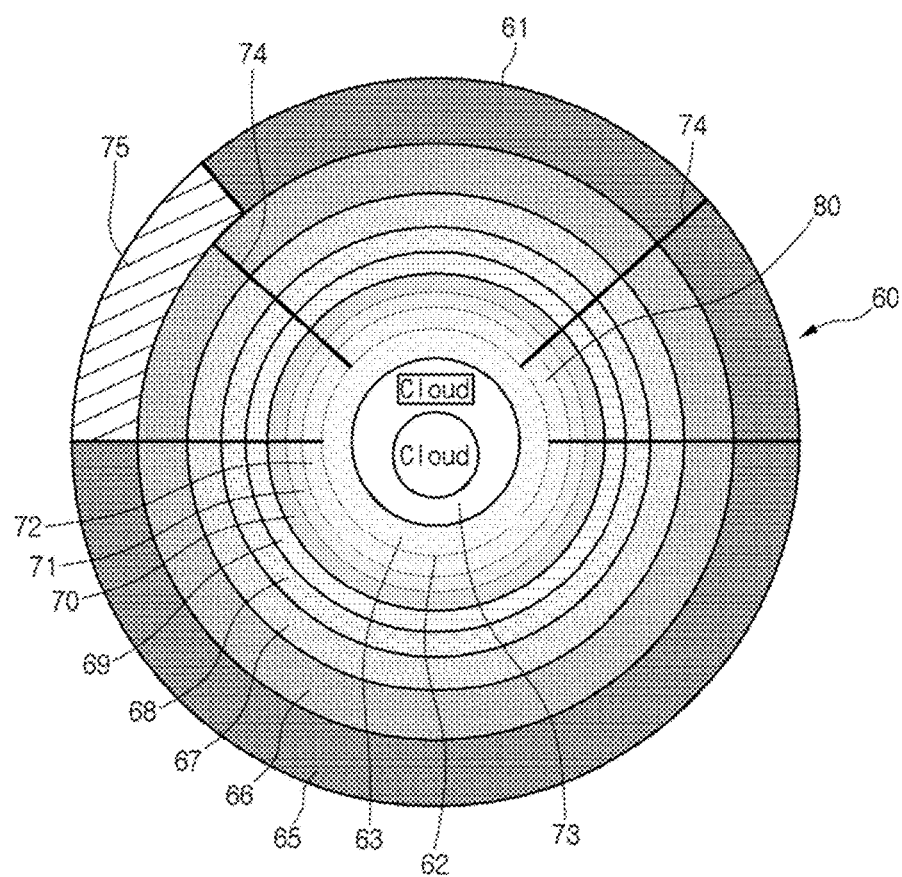
FIGS. 4 to 7 illustrate examples of UIs implemented by a network controlling apparatus.

Referring to FIG. 4, a UI 60 includes a first area and a second area defined by the center module 21 using a first closed curve 61 and a second closed curve 62. In the second area, the domains are divided according to network levels by the network apparatus module 22 using multiple closed curves. Herein, domains which are from different centers may be displayed with the same attribute if the domains are at the same level of the network.

The domains may be divided into L7 72, L6 71, L5 70, L4 69, L3 68, L2-operator 67, L2-user 66 arranged from the inside outward, and a hardware resource 65 may be display on the outermost side of the domains. The domains may be integrally displayed by the demand module 31. In addition, the domains may be displayed in various states by the network apparatus module 22. The connection module 33 may display a connection line connecting the nodes.

It can be seen from the figure that the second area is divided by the available-resource module 23 using division lines such that portions of a resource occupied by the respective centers different from each other. Preferably, the closed curves have a circular shape. However, embodiments of the present invention are not limited thereto. If the amount of resources of a specific domain occupied by a center differs from the amount of resources of the other domains, only a division line 74 corresponding to the specific domain may be differently displayed to distinctively display the amount of resources of the domain. In FIG. 4, the enlarged domain 75 having a larger amount of resources is indicated over a large area by the division line 74 compared to the other domains.

The cloud center module 24 may provide a clouding area 73 in the first area and map the cloud system to the clouding area. Herein, an empty area 63 may be provided between the clouding area 73 and the second area to further enhance visibility for the users.

A connection line 64 connecting the nodes may be expressed on the UI provided by the UI display unit 6 in a specific manner. If the nodes are virtualized nodes, the corresponding connection line 64 (see FIG. 5) may be indicated with a dotted line by the virtualization module 32.

The visualization determination unit 4 may provide a semi-transparent area 80. The semi-transparent area 80 may indicate that an accessor seeing a specific UI can see the inside of the area but cannot control the area. This area may be used when different services are provided according to classes of the users. In FIG. 4, the inside of the layer of L5 70 can be seen but cannot be controlled.

Figure 5:
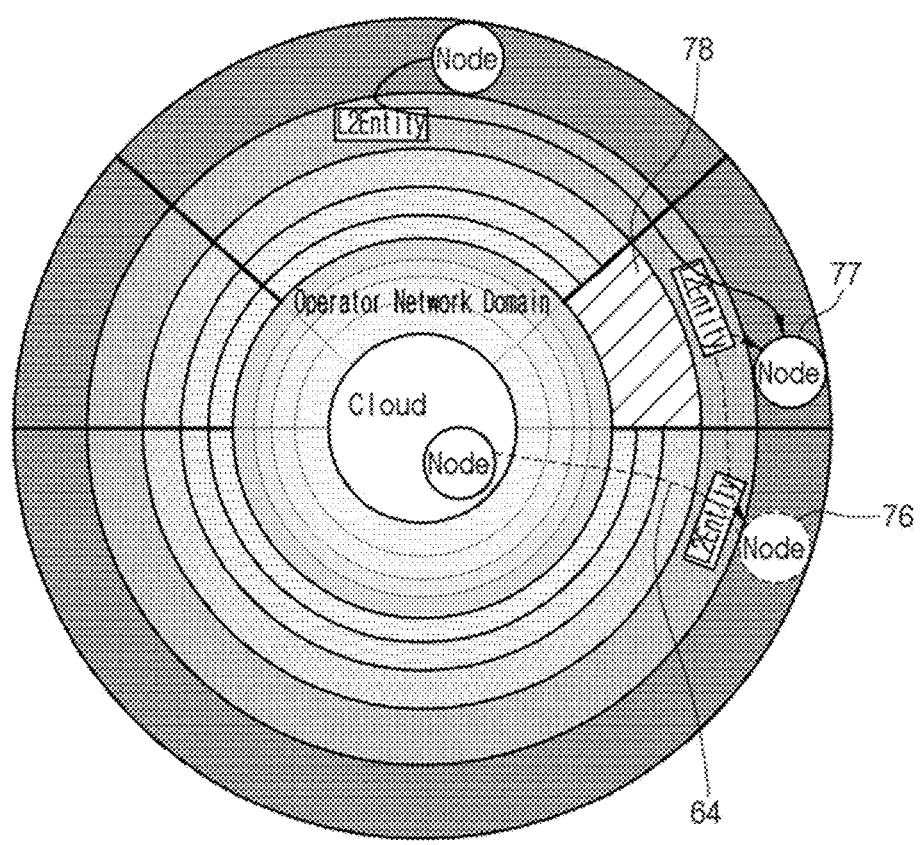

FIG. 5 shows an exemplary UI.

Referring to FIG. 5, nodes 76 and 77 are connected to another center using a L2 network apparatus (L2 entity). Herein, the nodes include a virtualized node 76 indicated with a dotted line by the virtualization module 32 and a physical node 77 indicated with a solid line as hardware apparatus. For the virtualized node 76, the connection line 64 indicating the connection status of the node is also indicated with a dotted line.

Meanwhile, the visualization determination unit 4 provides an opaque area 78. No participants except a user or some persons seeing a specific UI can see the center of the opaque area 78. Nor can the participants except the user or some persons control the center of the opaque area 78. This area may be used when different services are provided according to classes of the users.

Figure 6:
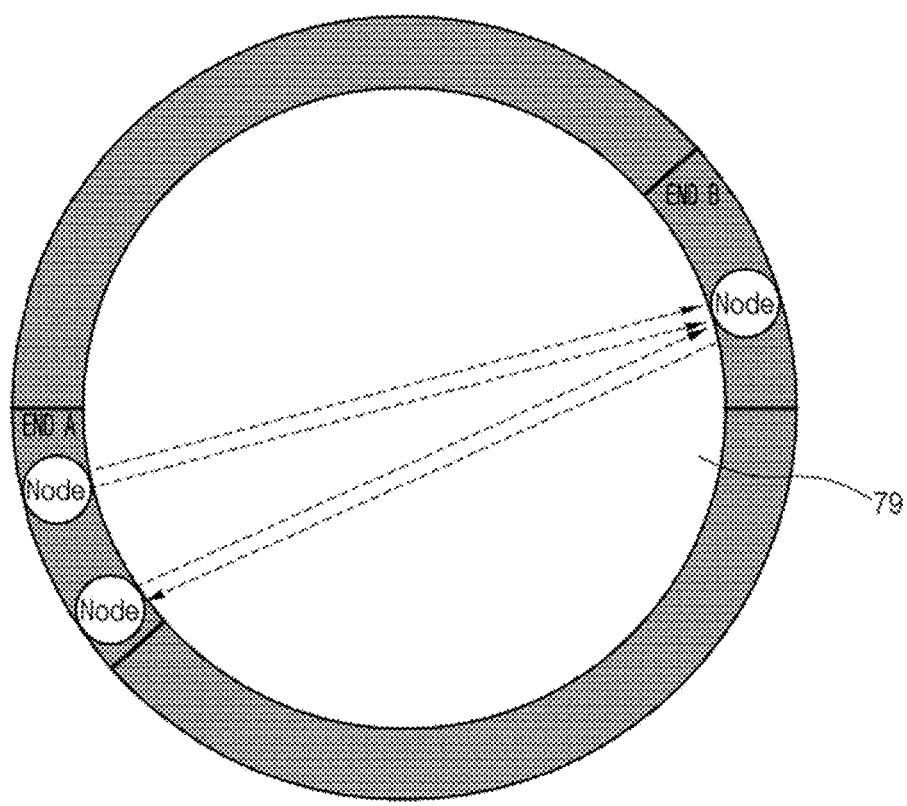

FIG. 6 shows another UI.

Referring to FIG. 6, the UI is provided to a user from the lowest class. Only an center (END A) to which the user belongs and a center (END B) which the user mainly uses may be displayed on the UI and the other areas may be set as opaque areas by the visualization determination unit 4.

Figure 7:
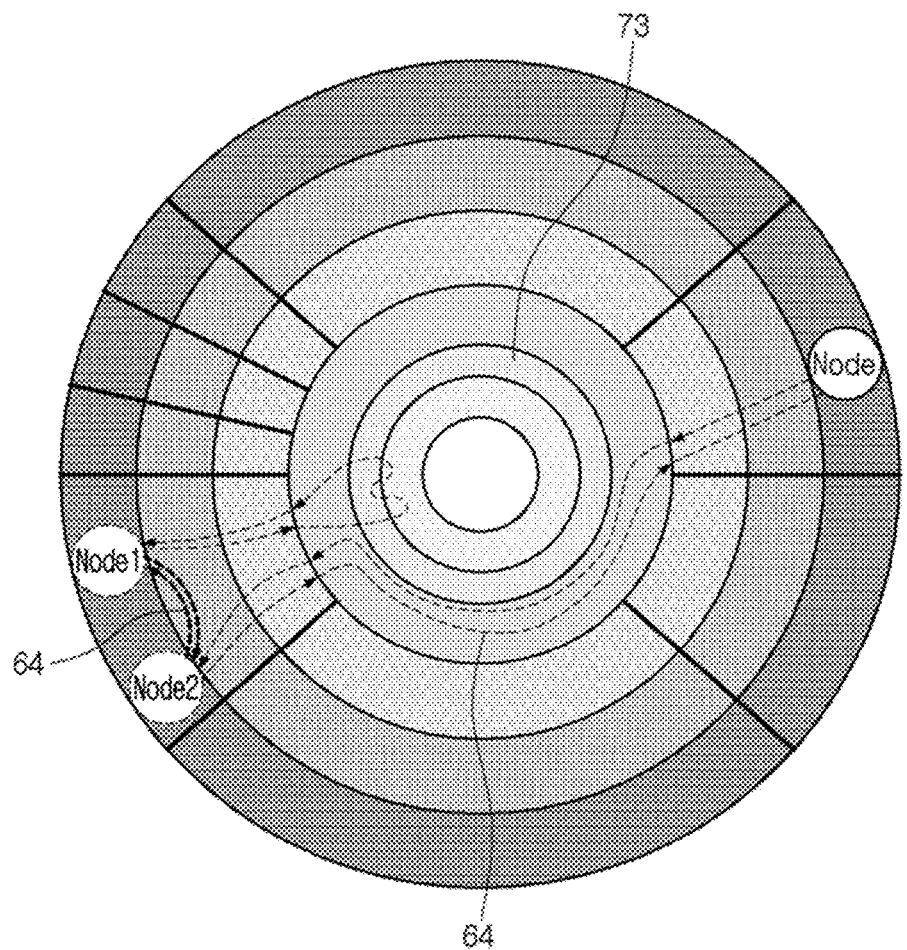

FIG. 7 shows another UI.

Referring to FIG. 7, the connection line 64 connecting node 1 and node 2 is indicated with a bold dotted line. In this case, the status determination unit 5 may indicate that the capacity of a link is large and that a large amount of network traffic can be provided. In addition, the connection line may be distinguished using a color. If the line is displayed in red, this indicates that the corresponding connection has large network traffic compared to the other connections. As a preferable example, the color of the connection line may change from green to red depending on traffic of the network.

Additionally, various connection lines may be used to indicate a center whose resources are utilized for networking or resource use by the nodes connected by the connection lines.

Figure 8:
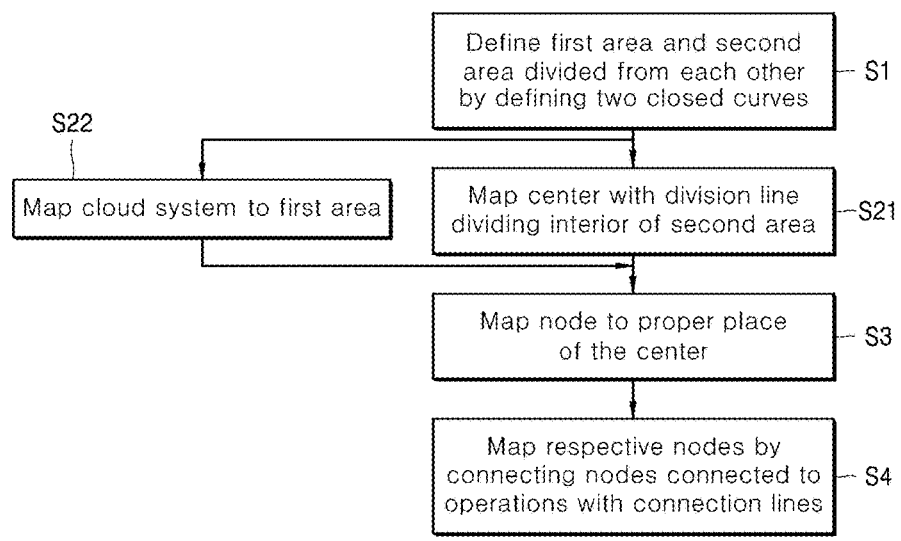
FIG. 8 illustrates a network control method according to an embodiment.

FIG. 8 illustrates a network control method according to an embodiment. The following description of the network control method is based on the description of the network controlling apparatus, and thus the description of the network controlling apparatus may be referenced for understanding of the network control method.

Referring to FIG. 8, a first area and a second area are defined using at least two closed curves which are not intersected with each other but at least have a common internal area (S1).

In mapping at least two centers, a space between the at least two closed curves which are not intersected with each other is defined as the second area, and the at least two centers are mapped using a division line connecting the at least two closed curves (S21). A clouding area to which a cloud system is mapped is defined in the common internal area of the two closed curves, which is defined as the first area, and then the cloud system is mapped into the clouding area (S22).

Thereafter, nodes operating at the at least two centers are mapped to places where the nodes are positioned (S3). The nodes include a VM. Mapping of connection lines indicating actual connection statuses of the nodes operating at the respective centers may be performed (S4).

The space between the clouding area and the closed curve may be left empty to define an empty area. A line may be provided in the second area to define domains according to network levels of the at least two centers.

It is apparent to those skilled in the art that the network controlling apparatus and method for enhancing visibility according to the embodiment described above can be implemented without providing at least one of constituents of the network controlling apparatus and method. It will be understood that this case is also within the scope of the present invention.

According to embodiments of the present invention, a network connection status may be recognized and visualized. Accordingly, the operator and users of a network may conveniently utilize resources of different centers and efficiently perform desired operations.

What is claimed is:

1. An integrated network controlling system comprising:
a network connecting at least two centers; and
a network controlling apparatus computer to control network connection for the at least two centers,
wherein the network controlling apparatus computer is configured to:
generate the at least two centers by disposing the at least two centers in a radial direction;
generate at least one node operating at the at least two centers;
generate a connection line indicating a status of connection between the at least one node;
generate a user interface (UI) as information containing the at least two centers, the node and the connection line and transmit the generated UI to at least one of the at least two centers; and
change the UI according to a change request and transmit the changed UI,
wherein the UI comprises at least two closed curves having a common internal area without intersecting each other, to define a first area as the common internal area of the at least two closed curves and a second area as a space between the at least two closed curves and to display the at least two centers in the second area by dividing the at least two centers with a division line connecting the at least two closed curves in the second area, and
wherein the first area contains a clouding area and a cloud center module configured to display a cloud center, the cloud center being placed in the clouding area.

2. The integrated network controlling system according to claim 1, wherein the change request comprises shift of a virtualized node of the at least one node.

3. The integrated network controlling system according to claim 1, wherein the closed curves have a circular shape.

4. The integrated network controlling system according to claim 1, wherein the at least one node is provided to the cloud center.

5. The integrated network controlling system according to claim 1, wherein an empty area is provided between the cloud center and the closed curves.

6. The integrated network controlling system according to claim 1,
wherein at least one closed curve accommodating the first area is provided inside the second area, and
wherein the center is divided into domains according to the network level.

7. The integrated network controlling system according to claim 6, wherein the closed curve dividing the domains in one of the centers has a circular shape.

8. The integrated network controlling system according to claim 6, wherein when the domains belong to the same level, the domains are displayed with the same attribute even if the centers are different from each other.

9. The integrated network controlling system according to claim 6, wherein the domains comprise hardware resources of the centers,
wherein an outer line of the domains in the centers moves to change the domain area, and
wherein the domain area is proportional to the domain resource size.

10. The integrated network controlling system according to claim 1, further comprising:
wherein a virtualized node of the at least one node is displayed differently from a non-virtualized node.

11. The integrated network controlling system according to claim 1,
wherein visualization ranges of the first area and the second area differently according to an authority of a participant accessing a network.

12. The integrated network controlling system according to claim 1
wherein the connection line is displayed differently according to a status of the connection line.

13. The integrated network controlling system according to claim 12, wherein the connection line is displayed in a different color according to load to the connection line.

* * * * *